Feb. 4, 1941.    J. C. HOAR    2,230,617
FORMING METAL PELLETS
Filed Nov. 17, 1938    2 Sheets-Sheet 1

INVENTOR.
JOHN C. HOAR.
BY S. Ernest Low
ATTORNEY.

Feb. 4, 1941. J. C. HOAR 2,230,617
FORMING METAL PELLETS
Filed Nov. 17, 1938 2 Sheets-Sheet 2
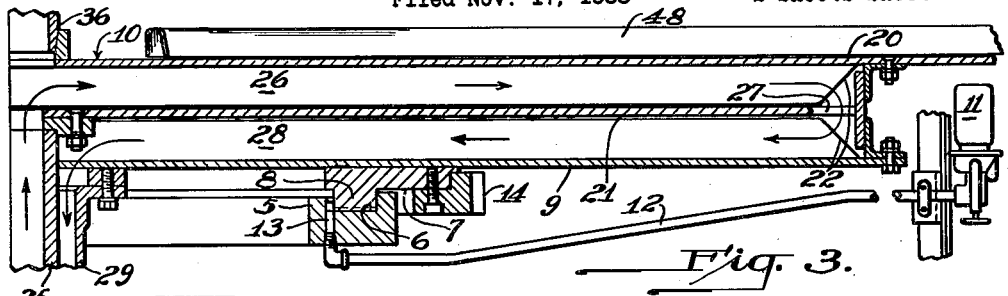
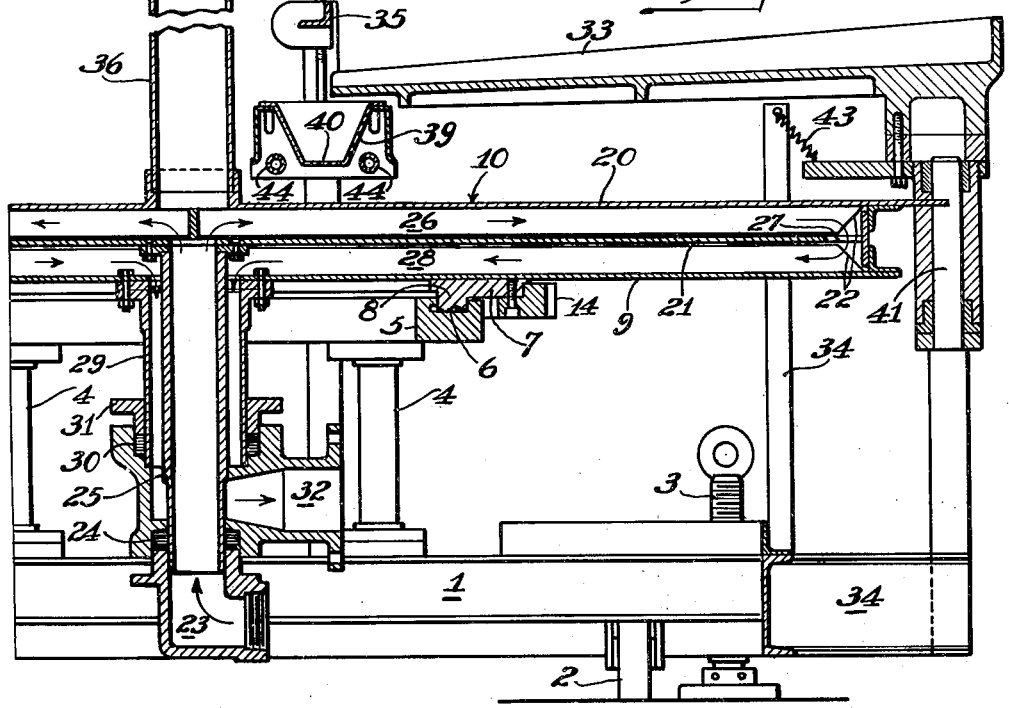
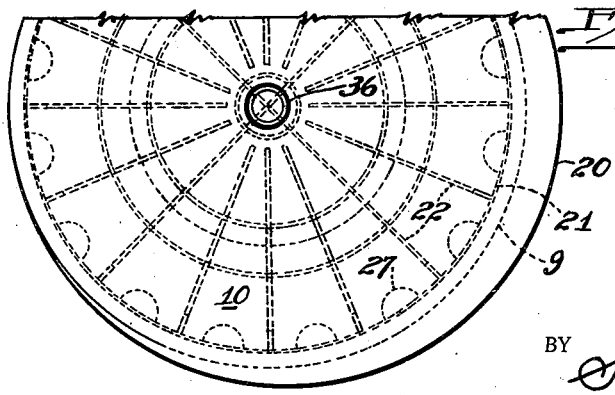
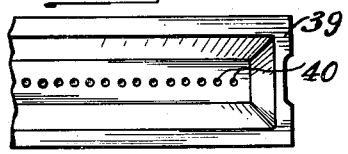
INVENTOR.
JOHN C. HOAR.
BY S. Ernest Low.
ATTORNEY.

Patented Feb. 4, 1941

2,230,617

UNITED STATES PATENT OFFICE 2,230,617

FORMING METAL PELLETS

John C. Hoar, New Kensington, Pa., assignor to Aluminum Company of America, Pittsburgh, Pa., a corporation of Pennsylvania Application November 17, 1938, Serial No. 240,974

4 Claims. (Cl. 83—91)

This invention relates to the formation of homogeneous discrete particles of metal, in the form of pellets, directly from metal in the molten state.

While the invention is particularly useful in the production of small bodies of aluminum capable of accurate volumetric measurement, such as, for instance, find general metallurgical utility in the iron and steel industry for fluxing or reducing molten ferrous-metal-oxides, the invention is not confined to the forming of aluminum but applies to other metals as well; and the metal product may be used for other purposes, such as for an intermediate material to be further comminuted.

Prior methods of producing small bodies of metal, wherein molten globules are cooled in the presence of water or steam, have resulted in a product of irregular size and shape, one which may contain air holes or voids, and more seriously one which may contain occluded water. This is particularly true of aluminum. The presence of water in a reducing agent for use in the production of iron or steel is obviously undesirable, since it tends to defeat the purpose of the reducing agent. The presence of air holes, voids, or water in a metallic reducing agent is further undesirable because the resulting non-uniform density of the metal particles impairs the accuracy of volumetric measurement for conveniently proportioning a charge. To obviate these difficulties, this invention provides means for producing solid, substantially uniform aluminum pellets, in which water does not come in contact with the molten or solidifying metal.

An object of this invention is to produce aluminum pellets of high effective density and free from occluded water. It is a further object of this invention to produce aluminum pellets of a relatively uniform size adapted for use as a ferrous-metal-oxide reducing agent. A further object is to produce these pellets without waste of metal.

Another object of this invention is the provision of an apparatus for making pellets of aluminum and like metals. And a further object is the provision of such an apparatus for continuous production, having a capacity for handling large amounts of metal in a given period.

The novel method may be carried out in many ways but it is preferred to practice it with the novel apparatus shown. Both method and apparatus are described further herein with respect to the aforementioned and other objects and advantages; a preferred form of the apparatus is illustrated by the accompanying drawings.

Referring to the drawings, in which like numerals designate like parts:

Figure 3 is a partial vertical section taken along line III—III of Figure 1, to an enlarged scale;

Figure 4 is a partial vertical section taken along line IV—IV of Figure 1, to an enlarged scale;

Figure 5 is a partial plan view of the rotatable platen, to a reduced scale; and Figure 6 is a partial plan view of the metal distributor, to an enlarged scale.

Figure 1:
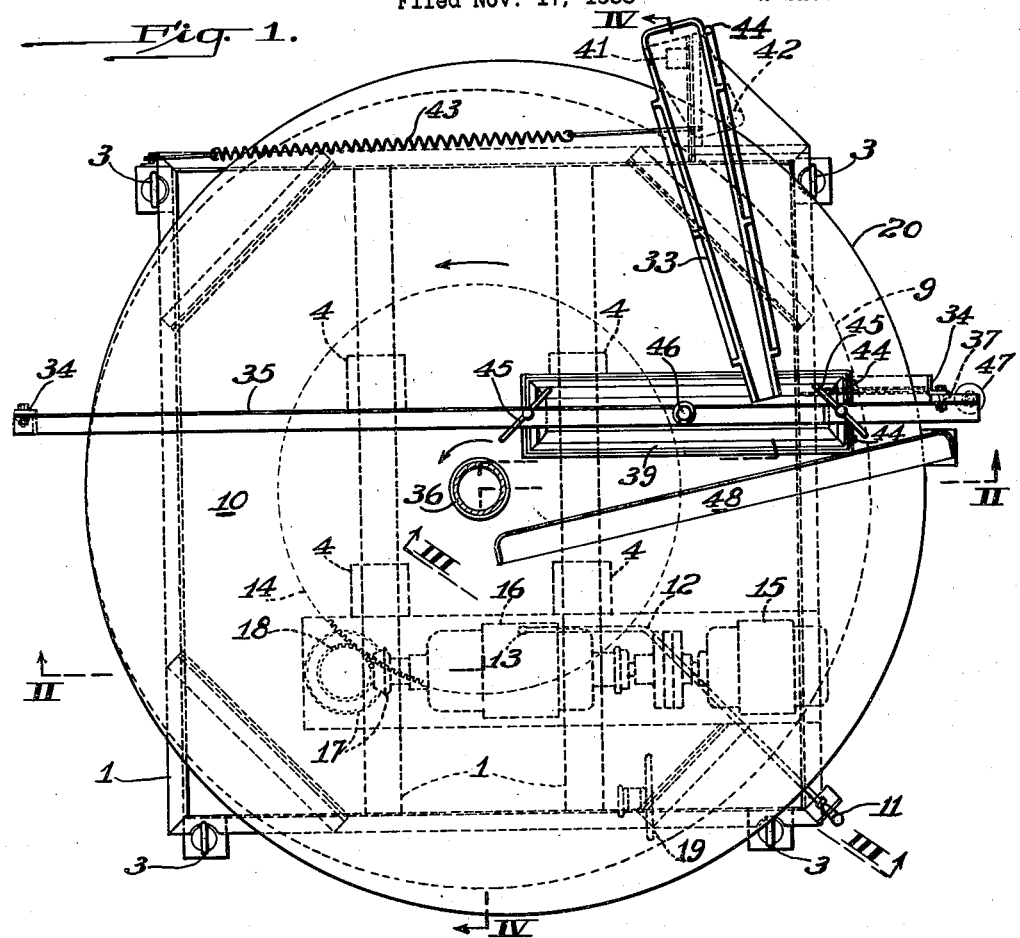
Figure 1 is a plan view of the apparatus.

In the drawings, the lower frame 1 of the apparatus, comprising framed structural members, supports the mechanism; and wheels 2, attached to frame 1, are provided for portability. Screws 3 are provided to raise the apparatus and support it when in use; and they may be drawn up when desired so that the machine may be moved on wheels 2.

Mounted on the intersecting members of frame 1 are suitable columns 4 which support a fixed annular ring 5 having a bearing groove 6 in its upper surface. A rotatable platen, identified generally by reference numeral 10, is provided on its under side with an annular ring 7 having a depending tongue portion 8 complementary with groove 6 and adapted for rotation therein; platen-ring 7 is fixed to a bottom plate 9 of platen 10. Lubrication of annular tongue and groove bearing surfaces 6 and 8, of rings 5 and 7, is provided for by an oiler 11 (Figure 3) which has a pipe line 12 directed to a recess 13 adjacent the bearing portions of the two annular members.

Figure 2:
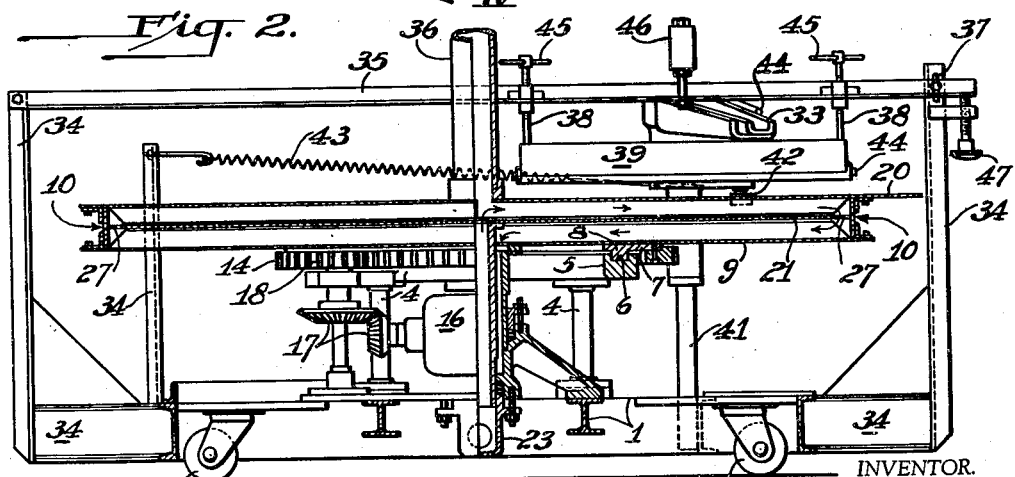
Figure 2 is a vertical section taken along line II—II of Figure 1.

For purposes to be described later, it is desirable that platen 10 be capable of continuous rotation at various uniform speeds. This may be provided for by any of several well known means. In Figures 1 and 2 there is shown a motor 15 adapted to drive an annular gear 14, suitably secured to ring 7 on platen 10, through a variable-speed gear-reducer 16, beveled gears 17, and a pinion 18, the pinion engaging annular gear 14. Hand wheel 19 is provided for controlling gear-reducer 16 to vary the speed of rotation of platen 10.

Platen 10 is preferably an assembled structure having a top plate 20, a middle separator plate 21, and the aforementioned bottom plate 9; associated with these plates are vertical radial baffles 22 which are adapted to direct the circulation of a coolant between the plates, within the platen. To supply an internal coolant to platen 10, such as water under pressure, there is provided a stationary inlet fitting 23. This fitting engages an associated outlet fitting 32, to be described later, as by means of screw threads provided thereon. The fitting 23 is constructed in the form of a packing gland surrounding a coolant inlet tube 25, centrally connected with and depending from platen 10, tube 25 being adapted to rotate with platen 10 to which it is fixed, as by bolts, on middle plate 21. Suitable packing 24 incorporated in the gland so formed provides a substantially fluid tight passage from inlet fitting 23 to tube 25. By means of this arrangement a coolant may be introduced through inlet fitting 23, and through tube 25, to the interior of platen 10. The coolant passage continues from tube 25 into an upper chamber 26 formed by top plate 20 and middle separator plate 21, the upper chamber 26 being also divided into segments by radial baffles 22. Upper chamber 26 is arranged to permit radial outward flow of a coolant through the segmental passages to the periphery of platen 10. A lower chamber 28 between middle plate 21 and bottom plate 9 is arranged to permit return radial flow, chambers 26 and 28 connecting through peripherally disposed semi-circular apertures 27 in the middle plate 21. It is preferable but not essential to provide a second set of radial baffles 22 in lower chamber 28 similar to those in upper chamber 26. From the central part of platen 10, a discharge coolant passage leads downward within an outlet pipe 29 and around inlet tube 25. Outlet pipe 29 is attached to platen 10 on bottom plate 9, as by bolts, and rotates with platen 10 as does inlet tube 25. A packing nut 31 around the lower end of pipe 29 engages, as by screw threads provided thereon, a fixed outlet fitting 32. The packing nut 31 and outlet fitting 32 are constructed in the form of a packing gland surrounding outlet pipe 29, and incorporate packing 30, to provide a substantially fluid tight passage. By means of this arrangement, similar to the inlet construction, the coolant may be discharged from platen 10 through pipe 29, and outlet fitting 32, to a reservoir or to waste. To assure the removal of air from the coolant passages so that the coolant will reach all parts of the platen, a standpipe 36 is provided, preferably at the center of platen 10.

A super-structure, identified generally by reference numeral 34, is located on frame 1 to support a bar 35 across the top of platen 10. Bar 35 is pivotally supported at one end in structure 34 at one side thereof and is fitted in a slot 37 by a pin in the structure 34 at the opposite side of platen 10. Suspended from bar 35 by suitable screws 38 (Figure 2) is a metal distributor 39 comprising a metal reservoir having holes or apertures 40 in its bottom, which is adapted to receive molten metal from a feed trough 33. Feed trough 33 is pivoted on a rod 41 from structure 34 to permit horizontal oscillation so that its pouring end or orifice may move from one end to the other of distributor 39 as platen 10 rotates.

The metal feeder, or feed trough, 33, may have the above mentioned oscillating movement imparted thereto by means of a cam and follower. The cam may be conveniently provided on platen 10, such as by forming top plate 20 with a larger diameter than the other plates of platen 10 and mounting it eccentric to the center of rotation of platen 10. Thus the top plate 20 in the embodiment disclosed in this specification serves as a cam surface. A cam follower 42, attached to the base of feed trough 33, is arranged to engage the cam surface of top plate 20 and is held against this cam surface by a spring 43 anchored in the super-structure 34. Thus when platen 10 rotates, the pouring end or orifice of trough 33 is caused to oscillate along the length of distributor 39.

Since molten metal should be supplied to distributor 39 from feed trough 33 at a rate sufficient to maintain a distributing head or supply therein, it may be desirable to heat the metal therein. A convenient way of maintaining proper temperature is by directing gas flames along the outer sides of feed trough 33 and distributor 39. Gas supply connections 44 for this purpose have been shown.

Distributor 39 preferably has a single row of holes 40 in its bottom plate (Figure 6). These holes are of a size such that discrete particles or globules of molten metal may fall or be released from each hole one at a time, and they are spaced so as to pass continually and simultaneously a relatively uniform plurality of globules onto top plate 20 of platen 10 as it is rotated. Proper distributing height may be effected by raising or lowering distributor 39 by means of the aforementioned screws 38 which may be adjusted by handles 45. The metal in distributor 39 may be agitated and the molten globules freed therefrom by vibrations induced in distributor 39 by vibrator 46 conveniently located on bar 35. A convenient form of vibrator is the readily available pneumatic vibrator.

A hand screw 47 controls the disposition of bar 35 and therefore of distributor 39 with respect to the horizontal. Adjustment of hand screw 47 may be made to provide a greater head of metal over the holes 40 adjacent the periphery of platen 10, where a more rapid distribution of molten globules may be desirable because of the higher lineal speed of the platen surface.

Pellets may be removed from platen 10, at a position in its course of rotation preceding the position of distributor 39, by means of a scraper or deflector 48 which is adapted to deflect the pellets into any suitable container (not shown). The deflector 48 is shown mounted on an auxiliary frame (Figure 1), and for clarity the preferred direction of rotation of platen 10 is indicated by an arrow.

With regard to the foregoing description of parts and their individual functions, there may now be explained, as an example, the operation of a particular form of this machine suitable for the aforementioned purposes, adapted to the presently disclosed method, and capable of producing aluminum pellets at the rate of 800 to 1500 pounds per hour. It is to be understood that modifications in the relationship of parts and in the method as it is applied to aluminum may be made, in order to adapt the preferred embodiment shown and the example of a method described to the making of pellets of other metals.

Molten aluminum from a remelting furnace is poured, ladled, or siphoned into feed trough 33 as platen 10 is rotated. Feed trough 33 oscillates, in response to the cam surface of top plate 20 and the follower 42, to feed the metal into distributor 39. The oscillation of feed trough 33 serves to supply and mix the metal by performing a function similar to stirring, for equalizing the metal distribution in the distributor and the heat distribution within the metal.

To insure even temperature and to prevent freezing of the metal in distributor 39, heat such as a gas flame may be applied to feed trough 33 and distributor 39. Heating of the distributor or the metal therein, however, may be dispensed with if a sufficient head of hot metal is maintained in the distributor. The flow of metal into the distributor and the passing of particles therefrom should be at a rate sufficient to prevent freezing, and it is preferable to keep the metal just above the temperature at which it will freeze.

Holes 40 evenly spaced in a single row (Figure 6) in the bottom of distributor 39, or spaced in a plurality of rows, permit the molten metal to pass onto top plate 20 of platen 10. For example, holes about 3/32 of an inch in diameter, and spaced in a single row about 1/4 to 1/2 inch from center to center in the closest positions may be employed, and have been found satisfactory.

A feature sometimes desirable in the operation of the distributor is the vibrator 46 for effecting agitation of the distributor 39 to overcome any tendency of the molten metal globules to cling to the distributor. The height of fall of the globules may be accurately adjusted by screws 38. For example, in the production of aluminum pellets, it has been found desirable to drop the molten particles or globules about 1 inch when the machine is used as is described herein; that is, the bottom of distributor 39 may be set about 1 inch from top plate 20 of platen 10.

As particles of aluminum fall onto platen 10, under the aforementioned conditions, it is preferably continuously rotated at a speed between 2 and 11 R. P. M. Speeds in this range have been found fast enough to clear one particle from succeeding particles and slow enough to permit adequate cooling and freezing of the particles, before their removal as solid pellets in less than one full revolution of platen 10. Other speeds will be found desirable under variations of these conditions, and it is for this reason that the variable speed gear-reducer 16 has been employed for varying platen speeds, as aforementioned. Speed may also be varied as differing metals or alloys are subjected to the process.

Platen 10, which is internally cooled by the circulation of any suitable coolant such as water, takes heat from the molten particles and thus causes them to solidify. It is contemplated that external cooling of platen 10 could be employed but it is preferred that liquid or water be kept away from the top surface where freezing of the particles into pellets takes place. Circulation of water in the coolant passage, as described, is the preferred means of removing heat from the platen, since the heat-removing water flow may be readily regulated to insure solidification of the metal globules before they must be removed from the platen. Other devices of similar function may be substituted for the platen, and cooling may take place as a positive or indirect step and by use of various mediums all depending upon the severity of the required cooling conditions.

Deflector 48 has been shown for removing the solidified pellets. It is set at an angle to a radius of platen 10 so as to deflect the metal pellets radially outward. Removal of the pellets may also be accomplished by such other means as an air jet or vacuum, any of which may be located adjacent the distributor so that the pellets are removed from the platen just before new particles of molten metal are distributed onto it.

The provision of any of these or other means of removing pellets, in combination with a conveyor or hopper, is contemplated, thus making the flow of metal to the apparatus, the formation of pellets, and their removal continuous and automatic.

It is desirable, in addition to the factors already discussed, that the surface of the top plate 20 should be clean and smooth so that the molten metal has no tendency to wet the platen surface and spread before freezing; it may be coated with a solution of graphite and oil.

In the foregoing description, the platen used for receiving and cooling the particles of molten metal has been rotatable. It is contemplated that any relative motion of distributor and platen should come within the scope of this invention. Also, cooling of the platen has been fully described with the alternative of external cooling, and it is to be further pointed out that any surface designed to cool the molten particles and dissipate the heat thus received into the air or into a fluid stream should also come within the concept of this invention.

The particular form of apparatus shown in the specific embodiment may be modified and changed without departing from the teaching of this invention. The novel features that are characteristic of this invention will be found set forth with particularity in the appended claims.

What is claimed is:

1. An apparatus for producing metal pellets comprising an internally cooled rotatable platen, said platen having internal radial passages therein for the circulation of a coolant, a metal distributor comprising a reservoir for molten metal having a plurality of spaced holes in the bottom thereof adapted to pass discrete particles of molten metal to said platen, a metal feeder for supplying molten metal to said metal distributor and adapted to maintain a substantially constant predetermined head of molten metal in said metal distributor reservoir, means for moving the metal supply orifice of said metal feeder over various portions of said metal distributor reservoir, said feeder moving means being operably connected with driving means for turning said platen, and means located in the direction of rotation of said platen an angular distance approaching one revolution from said metal distributor for removing discrete particles of metal in the form of pellets from said platen.

2. An apparatus for producing metal pellets comprising an internally cooled rotatable platen, a metal distributor mounted above said platen substantially along a radius thereof, said metal distributor having a reservoir for molten metal therein and a plurality of spaced holes in the bottom thereof adapted to pass a plurality of discrete particles of molten metal therethrough upon said platen, an oscillatable metal feeder for feeding and maintaining a head of molten metal in said metal distributor, cam operated means for oscillating said feeder over said metal distributor reservoir incorporating a cam operably connected with variable speed means for driving said platen and a cam follower mounted on said feeder, and a deflector mounted in juxtaposition with said platen at an angle to a radial line thereof for removing discrete particles of metal in the form of pellets from said platen.

said deflector located a substantial angular distance from said metal distributor in the direction of rotation of said platen.

3. An apparatus for producing metal pellets comprising an internally cooled rotatable platen, a metal distributor mounted above said platen substantially along a radius thereof, said metal distributor having a reservoir for molten metal therein and a plurality of spaced holes in the bottom thereof adapted to pass a plurality of discrete particles of molten metal therethrough upon said platen, an oscillatable metal feeder for feeding and maintaining a head of molten metal in said metal distributor, cam operated means for oscillating said feeder over said metal distributor reservoir incorporating a peripheral cam contour on said platen and a cam follower associated with said feeder, variable speed means for driving said platen, and a deflector mounted in juxtaposition with said platen at an angle to a radial line thereof for effecting removal of the said discrete particles of metal in the form of pellets from said platen, said deflector being located a substantial angular distance from said metal distributor in the direction of rotation of said platen.

4. An apparatus for producing metal pellets comprising a rotatable platen, passages in said platen for internal circulation of a coolant adapted to maintain the working surface of said platen at temperatures within a range for solidifying discrete particles of molten metal, said passages being formed by top and bottom plates of said platen, a separator plate intermediate said top and bottom plates, and radial baffles vertically disposed at suitable angular intervals between pairs of said plates, a metal distributor for distributing a plurality of discrete particles of molten metal onto the working surface of said platen, means for rotating said platen with its working surface at a substantially constant predetermined distance below said metal distributor, and means for removing discrete particles of metal in the form of pellets from the working surface of said platen.

JOHN C. HOAR.